Dec. 19, 1967  R. A. BUB  3,358,427
FILTER CONTAINING TUBULAR FILTER CELLS
Filed Oct. 19, 1965
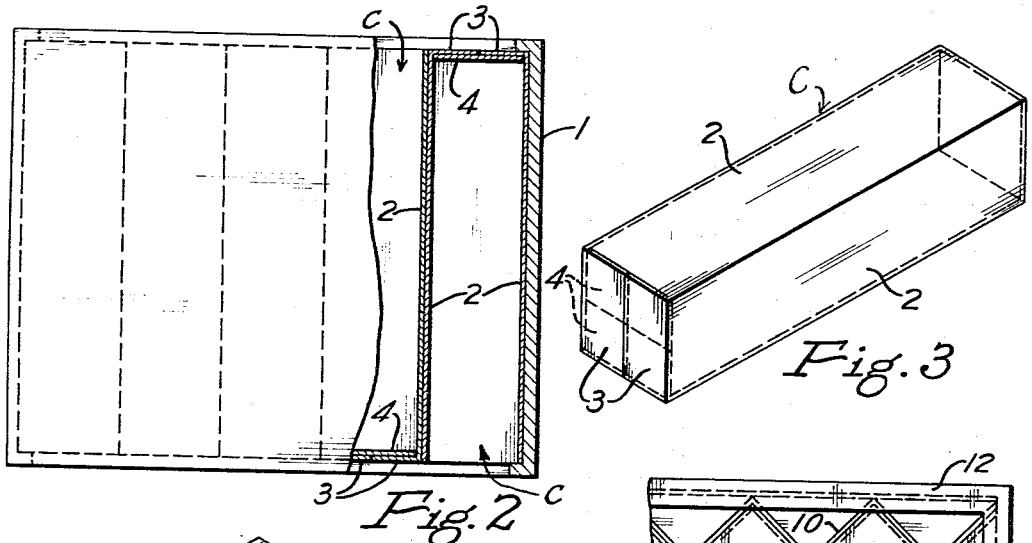
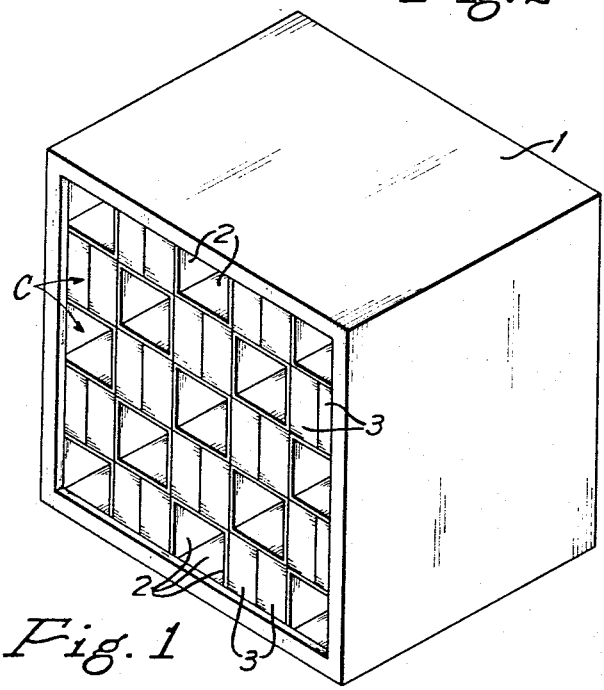
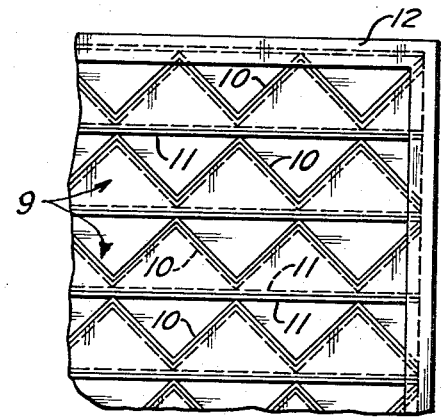
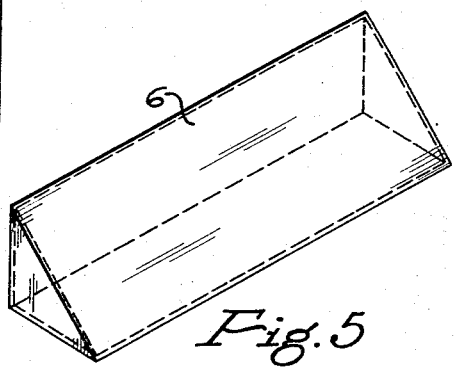
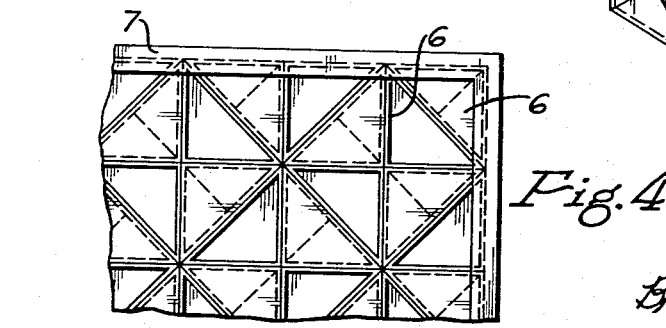
INVENTOR.
ROBERT A. BUB
BY
Brown, Critchlow, Flick & Peckham
ATTORNEYS.

United States Patent Office 3,358,427
Patented Dec. 19, 1967

3,358,427
FILTER CONTAINING TUBULAR
FILTER CELLS
Robert A. Bub, Gibsonia, Pa., assignor to MSA Research Corporation, Pittsburgh, Pa., a corporation of Pennsylvania
Filed Oct. 19, 1965, Ser. No. 497,989
2 Claims. (Cl. 55—350)

This invention relates to filters, and more particularly to those in which a plurality of tubular filter cells fill a filter housing.

A filter of the type with which this invention is concerned is shown in O'Dell Patent 3,151,962. That filter is composed of a rectangular housing, which is filled with tubular cells that extend from one open end of the housing to the other. The cells have flat sides in engagement with one another, and each cell is closed at one end. Alternate cells in each row have their open ends at one end of the housing, while the remaining cells in the same row have their open ends at the opposite end of the housing. Fluid flowing into the open ends of the cells at one end of the housing is filtered through their side walls into the adjoining cells and then flows out of the open ends of the latter at the opposite end of the housing. It will be noted that O'Dell's cells are wedge shape. Where the rectangular sides of the wedges engage one another, advantage can be taken of the full area of those sides in filtering the fluid passing through them. On the other hand, it will be seen that the area of each tapered side is only half that of a rectangular side. Furthermore, the engaging area of two adjoining tapered sides is reduced still further because it is reduced to a diamond shape, due to the closed end of each cell being beside the open end of the other cell. The result is that the filtering capacity of the tapered sides of the cells is reduced materially.

It is among the objects of this invention to provide a filter of the type just discussed, which is simpler to make and which has a greater filtering capacity.

In accordance with this invention, a filter housing has open ends and is filled with a plurality of flat-sided tubular filter cells in side-to-side engagement with one another. Each of the cells is closed at one end, and all of the cells have the same shape and the same size from end to end. The cells are arranged in parallel rows, with the ends of the cells located at the open ends of the housing. That is, alternate cells in each row have their open ends at one end of the housing, while the remaining cells in the same row have their open ends at the opposite end of the housing. Also, the open ends of the cells in each row are disposed beside the closed ends of the cells in the adjoining rows.

The invention is illustrated in the accompanying drawings, in which—

FIG. 1 is an isometric view of my filter;
FIG. 2 is a plan view of the filter, partly broken away in section;
FIG. 3 is an enlarged isometric view of one of the cells;
FIG. 4 is a fragmentary end view of a modified filter;
FIG. 5 is an isometric view of one of the cells in the modified filter; and
FIG. 6 is a fragmentary end view of another embodiment.

Referring to FIGS. 1 to 3 of the drawings, a filter housing 1 of any desired shape, but generally rectangular, is formed from any suitable impervious material and has open ends. This housing is filled with tubular filter cells C, each of which has four flat sides 2 and one closed end. The closed end is formed by overlapping end flaps 3 and 4 so that the end wall of the cell is double thickness. The cells are arranged in superimposed parallel rows, with the ends of the cells located at the open ends of the housing. Since the cells are disposed side-by-side in engagement with one another, there also is a double thickness wall separating the interiors of each pair of adjoining cells, as shown in FIG. 2. Alternate cells are turned end for end so that alternate cells in each row have their open ends at one end of the housing, but the rest of the cells in the same row have their open ends at the opposite end of the housing. This same arrangement is followed in a vertical direction, whereby the open ends of the cells in each row are disposed beside the closed ends of the cells in the row above or below. Each end of the filter therefore has a checkerboard appearance, as seen in FIG. 1.

It will be seen that a fluid flowing into one end of the filter will freely enter all of the cells that have open ends at that end. Most of the fluid then will pass horizontally and vertically through the side walls of those cells and the side walls of the adjoining cells and out of the open ends of the latter at the far end of the filter. Some fluid will flow through the end walls of the cells, either into or out of the cells. Regardless of which paths the fluid takes, it will be filtered through two thicknesses of filtering material, and the full area of every side wall of the cells will be utilized for maximum capacity. Since each cell is the same size and shape throughout its length, it is easy and inexpensive to fold from a rectangular sheet of filtering material. All of the walls or filtering layers can be the same, or one group of cells can be made of a different material than the other group so that they will have different properties. This permits a wide range of efficiencies, resistances, dust capacities and physical properties.

Cells having cross sectional shapes other than rectangular can likewise be used. For example, each tubular cell 6 can be triangular in cross section as shown in FIGS. 4 and 5. Here again the cells are arranged in side-to-side engagement in parallel vertical and horizontal rows inside of an open end housing 7, with alternate cells having their open ends at the same end of the housing.

In a further embodiment of the invention, illustrated in FIG. 6, the cells are triangular but they are formed in a different manner than in FIG. 5. Thus, a group of cells 9 is formed side by side by means of a zigzag sheet 10 of filtering material attached at intervals to a flat sheet 11 of filtering material. All of the cells in the group are closed at the same end by a double layer of material, but when the groups are assembled, adjoining groups are reversed. The flat sheets in the assembly extend across the surrounding filter housing 12 and are arranged in flat engagement with each other in spaced pairs, whereby spaced pairs of the zigzag sheets engage each other in nesting relation. When all of the cells are assembled as shown, it will be seen that they are disposed in parallel rows extending across the filter housing and up and down in it. In each row, alternate cells have their open ends at one end of the housing and the remaining cells in the same row have their open ends at the opposite end of the housing. This manner of constructing the cells is faster than making separate cells, and it also reduces the number of elements that have to be handled in filling a housing with the cells.

According to the provisions of the patent statutes, I have explained the principle of my invention and have illustrated and described what I now consider to represent its best embodiment. However, I desire to have its understood that, within the scope of the appended claims, the invention may be practiced otherwise than as specifically illustrated and described.

I claim:
1. A filter comprising a housing having open ends, and a plurality of flat-sided tubular filter cells in side-to-side engagement filling said housing, each of the cells having at least three flat outer side surfaces, the cells being formed from sheets of filtering material and each of said cells being closed at only one end, the planes of the sheet material forming the flat sides of the cells being parallel to the longitudinal axes of the cells, all sides and the closed ends of the cells being made of filtering material, all of the cells having the same shape and being the same size from end to end, the cells being arranged in parallel rows with the ends of the cells located at said open ends of the housing and with the outer surfaces of the sides of each cell in coextensive engagement with the outer surfaces of the sides of the adjoining cells to form double walls between the cells, alternate cells in each row having their open ends at one end of the housing and the remaining cells in the same row having their open ends at the opposite end of the housing, and the open ends of the cells in each row being disposed beside the closed ends of the cells in the adjoining rows.

2. A filter according to claim 1, in which said cells are triangular in transverse section and arranged in parallel groups, the cells in each group being formed from two of said sheets connected together, one sheet in each group being flat and the other being zigzag and engaging the flat sheet along spaced parallel lines, said flat sheet engaging the flat sheet of an adjoining group of like cells, said zigzag sheet nesting with the zigzag sheet of another adjoining group of like cells, all of the cells in the first-mentioned group having their closed ends at one end of the housing, and all of the cells in the other two mentioned groups having their closed ends at the opposite end of the housing.

References Cited

UNITED STATES PATENTS

| | | | |
|---|---|---|---|
| 2,008,751 | 7/1935 | Davies | 55—500 |
| 2,862,573 | 12/1958 | Scott | 55—482 |
| 2,980,208 | 4/1961 | Neumann | 210—493 |
| 3,144,315 | 8/1964 | Hunn | 55—521 |
| 3,146,197 | 8/1964 | Getzkin | 55—497 |
| 3,151,962 | 10/1964 | O'Dell | 55—350 |
| 3,242,649 | 3/1966 | Rivers | 210—493 |
| 3,258,900 | 6/1966 | Harms | 55—485 |

FOREIGN PATENTS

| | | |
|---|---|---|
| 659,067 | 3/1963 | Canada. |
| 812,635 | 2/1937 | France. |
| 344,806 | 3/1931 | Great Britain. |
| 978,465 | 12/1964 | Great Britain. |

HARRY B. THORNTON, *Primary Examiner.*

B. NOZICK, *Assistant Examiner.*